United States Patent [19]

Swift et al.

[11] 4,434,281

[45] Feb. 28, 1984

[54] POLYMERIZING OLEFINS WITH A NOVEL CATALYST

[75] Inventors: Harold E. Swift, Gibsonia; Richard W. Lunden, Pittsburgh, both of Pa.

[73] Assignee: Gulf Research & Development Company, Pittsburgh, Pa.

[21] Appl. No.: 434,702

[22] Filed: Oct. 19, 1982

Related U.S. Application Data

[62] Division of Ser. No. 227,691, Jan. 23, 1981, Pat. No. 4,376,061.

[51] Int. Cl.$^3$ .......................... C08F 4/02; C08F 10/00
[52] U.S. Cl. ..................................... 526/119; 526/129; 526/351
[58] Field of Search ............................... 526/129, 119

[56] References Cited

U.S. PATENT DOCUMENTS 3,787,384 1/1974 Stevens et al. ........................ 526/129
4,081,589 3/1978 Peters et al. ......................... 526/129
4,210,738 7/1980 Hermans et al. ..................... 526/142

FOREIGN PATENT DOCUMENTS 2010870 7/1979 United Kingdom ................ 526/129

Primary Examiner—Edward J. Smith
Attorney, Agent, or Firm—Deane E. Keith; Forrest D. Stine

[57] ABSTRACT

There is provided a solid, particulate, catalytic complex suitable for the stereospecific polymerization of olefins prepared by reducing $TiCl_4$, contacting the resultant reduced solid with a complexing agent to obtain a treated solid and contacting the treated solid with $TiCl_4$ in the presence of silica which has been treated with an alkylaluminum halide. When such a catalyst complex is combined with a suitable activator to polymerize olefins, a high degree of stereospecificity is attained, the activity of the catalyst complex is reduced for polymerization control and the efficiency of the titanium employed is enhanced.

39 Claims, No Drawings

POLYMERIZING OLEFINS WITH A NOVEL CATALYST

CROSS-REFERENCES TO RELATED APPLICATIONS

This is a division of application Ser. No. 227,691, filed Jan. 23, 1981, now U.S. Pat. No. 4,376,061.

FIELD OF THE INVENTION

The present invention relates to a novel catalyst composition which is useful in the stereospecific polymerization of olefins. This invention also relates to a process for using such a catalyst composition to polymerize olefins.

DESCRIPTION OF THE PRIOR ART

It is well known in the art to use metallic catalysts to polymerize olefins such as ethylene, propylene, 1-butene and the like to form polymers of high molecular weight. One such general class of metallic catalyst are the "Ziegler-Natta" types consisting of aluminum alkyls or alkyl halides and titanium halides. Such catalysts polymerize olefins in a stereospecific manner resulting in the formation of olefin polymers which are characterized by high degrees of isotacticity and crystallinity.

British Pat. No. 1,391,067 to Hermans et al, the disclosure of which is incorporated herein by reference, discloses the preparation of a solid, particulate catalytic complex for the stereospecific polymerization of olefins. The catalytic complex is prepared by reducing $TiCl_4$ to obtain $TiCl_3$, treating the $TiCl_3$ with a complexing agent and then contacting the treated $TiCl_3$ with liquid $TiCl_4$. The resultant catalyst complex in combination with a suitable activator, such as an organo compound of aluminum, is used to polymerize olefins to obtain highly crystalline polymers. However, the activity of the catalyst complex is so high as to cause problems during polymerization, e.g., very rapid local polymerization at the point where the catalyst is fed to the polymerization reactor. This can lead to fouling problems in the reactor or the production of non-uniform products.

British Pat. No. 2,010,870 A to Hyde discloses that alpha olefins can be polymerized by contacting them under polymerization conditions using a catalyst component comprising a transition metal compound, for example, $TiCl_4$, and a co-catalyst component, for example triethylaluminum. Rather than use $TiCl_4$ alone in such combination, it can be prereacted with a support material. When $TiCl_4$ is so supported, the resultant catalyst has a very high activity and can cause polymerization problems. The claimed invention resides in admixing silica with the catalyst combination. The presence of silica in the catalyst system reduces the activity of the catalyst moderating the polymerization reaction wherein it is used and also results in a more efficient use of the titanium employed.

SUMMARY OF THE INVENTION

It has now been found that a solid, particulate, catalytic complex suitable for the stereospecific polymerization of olefins can be prepared by reducing $TiCl_4$, contacting the resultant reduced solid with a complexing agent to obtain a treated solid and contacting the treated solid with $TiCl_4$ in the presence of silica which has been treated with an alkylaluminum halide. When such a catalyst complex is combined with a suitable activator to polymerize olefins, a high degree of stereospecificity is attained. The activity of the catalyst complex is reduced for polymerization control as compared to the activated catalyst complex disclosed in British Pat. No. 1,391,067. However, by using the treated silica, the amount of polymer formed per amount of titanium employed is increased. If the silica used in the preparation of the catalyst complex of this invention is not pretreated with an alkylaluminum halide, it acts to deactivate some of the active titanium polymerization sites.

The alkylaluminum halide used to treat the silica can be defined by the following formula:

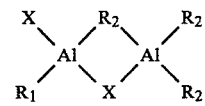

wherein $R_1$ can be an alkyl group having from about one to about six carbon atoms, preferably having from about one to about four carbon atoms, $R_2$ can be the same as $R_1$ or a halogen, especially chlorine, and X can be a halogen, especially chlorine. Specific examples of alkylaluminum halides that can be used include ethylaluminum dichloride, diethylaluminum chloride, propylaluminum dichloride, dipropylaluminum chloride, dihexylaluminum chloride, ethylaluminum sesquichloride, methylaluminum sesquichloride, dibutylaluminum chloride, isobutylaluminum sesquichloride, etc.

The silica employed herein is suitably any silica having a mean particle size in the range of about 1 to about 100 microns, preferably from about 1 to about 25 microns.

In treating the silica herein with the alkylaluminum halide, the molar ratios of alkylaluminum halide to silica can be in the range of about 1:40 to about 1:1, preferably about 1:20 to about 1:2.

To assure that the silica is free of water prior to being treated with the alkylaluminum halide, it is preferred that it be calcined in any suitable atmosphere, for example, air, nitrogen or hydrogen, at a temperature in the range of about 350° to about 700° C., preferably about 400° to about 500° C., for about one to about five hours, preferably about two to three hours, at a pressure that can be as high as about 500 pounds per square inch gauge (3450 kPa), but preferably is atmospheric.

Treatment of the silica with the alkylaluminum halide can be effected by introducing them into a hydrocarbon solvent, such as hexane, heptane and cyclohexane, and, while stirring, heating the resulting slurry in a temperature range of about 70° to about 300° C., preferably about 100° to about 200° C., for about one to about ten hours, preferably about two to about five hours, at a pressure which can be as high as about 500 pounds per square inch gauge (3450 kPa), but preferably about atmospheric. The treated silica can be washed with a suitable hydrocarbon solvent, for example, such as defined above, filtered and dried in a vacuum to remove solvent therefrom.

DESCRIPTION OF THE PREFERRED EMBODIMENTS

In preparing the catalyst complex, $TiCl_4$ is reduced to a solid product based on $TiCl_3$ (referred to herein as "reduced solid") as described in British Pat. No. 1,391,067. This is accomplished by means of treatment with a reducing agent of the general formula AlR$_n$X$_{3-n}$, in which R can be a hydrocarbon radical containing from 1 to 18 carbon atoms, preferably from 1 to 12 carbon atoms, e.g., R can be an alkyl, aryl, arylalkyl, alkylaryl, or cycloalkyl radical containing from 2 to 6 carbon atoms; X is a halogen, e.g., fluorine, chlorine, bromine, or iodine, preferably chlorine; n is any number greater than 0 but no greater than 3, preferably not less than 1.5 nor greater than 2.5, the best results being obtained when n is equal to 2.

Suitable reducing agents which may also be used include organoaluminum polymers obtained by reacting a trialkylaluminum, in which the alkyl radicals may contain from 1 to 18 carbon atoms, with a diolefin containing from 4 to 18 carbon atoms; more particularly, therefore, use may be made of the compounds known as isoprenylaluminums. These reducing agents are similar for the present purpose to those of the formula AlR$_3$.

The free-flowing characteristics of the reduced solid obtained in this manner are excellent, and its apparent density is very high (from 0.8 to 1.3 kg/dm$^3$).

In order to obtain this reduced solid having good morphology, it is preferred for the reduction to be carried out under mild conditions, with slight agitation, at a temperature between $-100°$ and $30°$ C., preferably between $-50°$ and $20°$ C. Particularly good results are obtained when the reduction is carried out at $0\pm2°$ C. It is advantageous for the reaction to be performed in an inert diluent, which can be any of those commonly used in the polymerization of olefins, and preferably comprises one or more aliphatic or cycloaliphatic hydrocarbons containing from 5 to 12 carbon atoms. The diluent most conveniently used is hexane. This type of diluent can be used throughout the preparation of the catalytic complex.

A convenient procedure consists in dissolving the TiCl$_4$ in the inert diluent in a proportion of 100 to 400 ml. of TiCl$_4$, preferably 200 to 300 ml. of TiCl$_4$, per liter of diluent and progressively adding the reducing agent, dissolved in a diluent in a proportion of 250 to 500 g., preferably 350 to 425 g., of reducing agent per liter of diluent. The addition of the reducing agent is preferably spread out over a long period, for example, more than 1 hour and preferably more than 3 hours. The proportion of reducing agent used is suitably about one mole per mole of TiCl$_4$. Nevertheless, a slight excess of reducing agent (for example up to 25%) does not impair the formation of a reduced solid having a good morphology.

Another procedure which may be followed consists in preparing a solution of TiCl$_4$ and the reducing agent at a very low temperature (for example, between $-100°$ and $-50°$ C.) and allowing the temperature to rise very slowly to ambient temperature, for example, over a period of 6 hours.

After the reagents have been brought together, the temperature of the reaction mixture can be progressively raised to between $20°$ and $120°$ C., preferably between $40°$ and $100°$ C., under continuous moderate agitation. Heat treatment can then be effected at a moderate temperature, this temperature being maintained throughout the period of the heat treatment, which is advantageously over 15 minutes. The higher the temperature at which the heat treatment is effected, the shorter the time required for this treatment will generally be. The reduced solid thus prepared can optionally be separated from the reaction medium by any applicable method, and then washed with diluent.

The reduced solid obtained is not composed exclusively of TiCl$_3$, but is a TiCl$_3$-based composition containing aluminum compounds which contain halogen and/or hydrocarbon radicals. Preferably the composition contains more than 0.3 molecule of aluminum compound(s) per molecule of TiCl$_3$.

In this reduced solid, the TiCl$_3$ is essentially in the beta crystalline form. The specific surface area of this reduced solid is low (about 1 m$^2$/g), and its catalytic properties are not good. More particularly, its stereospecificity and its activity are poor.

The reduced solid thus prepared is next treated as described in British Pat. No. 1,391,067 with a complexing agent, this being a compound capable of forming complexes with titanium chloride, aluminum halides, and aluminum organohalides. It is preferred to use an organic compound containing one or more donor atoms or groups having one or more pairs of freely available electrons capable of effecting coordination with titanium and aluminum and containing from 1 to 30 carbon atoms per electron donor atom or group.

Among the atoms capable of donating one or more pairs of electrons are the atoms of non-metals of Groups V and VI of the Periodic Classification, for example, oxygen, sulfur, nitrogen, phosphorus, antimony and arsenic.

As examples of organic compounds containing groups capable of donating one or more pairs of electrons mention may be made of ethers, thioethers, thiols, phosphines, stibines, arsines, amines, amides, ketones and esters.

It is preferred to use complexing agents of the general formula R'—O—R", R'—S—R", R'—N—R" or R'—S—H, in which R' and R" are each a hydrocarbon radical containing from 1 to 15 carbon atoms, and preferably an alkyl, aryl, arylalkyl, alkylaryl or cycloalkyl radical. R' and R" can be the same or different. Particularly good results are obtained when R' and R" are unbranched or branched aliphatic radicals, are identical, and contain from 2 to 8 carbon atoms, preferably from 4 to 6 carbon atoms.

The treatment of the reduced solid with the complexing agent (to form what is herein referred to as the "treated solid") is advantageously effected in the presence of the diluent used in the reduction of the TiCl$_4$, assuming that one is used and the reduced solid is not separated. The reduced solid can be kept in suspension by agitation. If preferred, however, a fresh diluent can be used instead. The proportion of diluent is preferably such that the content of reduced solid therein is equivalent to between 0.03 and 4 moles of TiCl$_3$ (i.e., TiCl$_3$ present in the reducing solid) per liter of diluent, e.g., equivalent to between 0.3 and 2 moles of TiCl$_3$ per liter of diluent. The temperature during the treatment with the complexing agent is not critical, but it is preferred to operate at a temperature between $0°$ and $80°$ C. The period of the treatment with the complexing agent is also not critical, but a period longer than 5 minutes is preferable.

The proportion of complexing agent used in preferably between 0.1 and 2.5 moles, e.g., between 0.5 and 1.75 moles, per mole of TiCl$_3$ present in the reduced solids. Particularly good results are obtained when a proportion of complexing agent between 0.8 and 1 mole per mole of TiCl$_3$ present in the reduced solid is used.

The solid which has been treated with the complexing agent can optionally be separated from the treatment medium by decantation or filtration and washed with an inert diluent.

The treated solid generally has a physical form similar to that of the reduced solid, and a similar specific surface area. As for its chemical constitution, it contains, not only beta-$TiCl_3$ and the aluminum compound, but also the complexing agent. The catalytic properties of this treated solid, like those of the reduced solid, are not good.

The treated solid is then contacted with $TiCl_4$ in the presence of the silica treated with the alkylaluminum halide previously described under the conditions described in British Pat. No. 1,391,067 for contacting treated solid with $TiCl_4$. The weight percent of the treated silica in the final catalytic complex can be in the range of about 90 to about 10, preferably about 60 to about 40. Preferably, the treated silica is mixed with the treated solid prior to contact with the $TiCl_4$. Contact with the $TiCl_4$ can be accomplished either using undiluted $TiCl_4$ or in the presence of an inert diluent. In the latter case the concentration of the $TiCl_4$ is preferably greater than 15% by volume, e.g., between 30 and 40%. There may optionally be present also a certain amount of added complexing agent, or of complexing agent remaining from the preceding operation.

The reaction of the treated solid and treated silica with the $TiCl_4$ is preferably effected at a temperature between $-30°$ and $+100°$ C., e.g., between $40°$ and $80°$ C. Particularly good results are obtained when the temperature is between $60°$ and $70°$ C. The reaction time is preferably between 30 minutes and 4 hours, e.g., between 1 and 3 hours. In the course of the reaction whereby the catalytic complex is formed, the treated solid and treated silica can be kept in suspension by moderate agitation. The separation of the catalytic complex from its reaction medium can be effected by filtration or decantation and the complex can then be washed with diluent to eliminate the residual $TiCl_4$ and also the by-products of the reaction. The resulting complex can be ground to suitable size, for example, in the range of about 1 to about 25 microns, preferably about 1 to about 5 microns.

The catalytic complexes prepared as described above can be used for polymerizing olefins and enable highly crystalline polymers to be obtained. They can be used together with an activator comprising an organo compound of a metal of Group Ia, IIa or IIIb of the Periodic Classification, and preferably comprise an organo compound of aluminum of the formula $AlR''''_mX'_{3-m}$ where $R''''$ is a hydrocarbon radical containing from 1 to 18 carbon atoms, $X'$ is a halogen, and m is any number greater than 0 but not greater than 3. This organo compound of aluminum (if used) can be identical with or different from the aluminum compound of the same general type used as a reducing agent in the preparation of the catalytic complex. Particularly good results are obtained with diethylaluminum chloride, which permits very high activity and stereospecificity to be attained by the catalytic system.

The catalytic systems described above can be used for the polymerization of olefins whose molecule contains from 2 to 18, preferably 2 to 6 carbon atoms, e.g., ethylene, propylene, butene-1, pentene-1, the methylbutenes-1, hexene-1, 3- and 4-methyl-pentenes-1, and vinylcyclohexane. They are particularly valuable in the polymerization of propylene, butene-1, and 4-methylpentene-1 to give highly isotactic crystalline polymers. They can also be used for the copolymerization of these olefins with one another and/or with diolefins containing from 4 to 18 carbon atoms. The diolefins are preferably non-conjugated aliphatic diolefins, e.g., hexadiene-1,4; non-conjugated monocyclic diolefins, e.g., 4-vinylcyclohexene; alicyclic diolefins having an endocyclic bridge, e.g., dicyclopentadiene, or methylene- or ethylidene-norbornene; and conjugated aliphatic diolefins, e.g., butadiene or isoprene.

They can also be used for the production of so-called block copolymers, from mono-olefins and diolefins. These block copolymers comprise series of chain segments of various lengths, each segment consisting of a homopolymer of a mono-olefin or of a random copolymer of an olefin and at least one comonomer; the (or each) comonomer can be a mono-olefin or diolefin.

The process of the invention is particularly suitable for the production of propylene homopolymers and of propylene copolymers containing at least 50% (preferably 75%) by weight propylene.

The polymerization can be effected by any applicable process. Thus the monomer(s) can be dissolved or suspended in a hydrocarbon solvent or diluent which preferably comprises one or more aliphatic or cycloaliphatic hydrocarbons, e.g., butane, pentane, hexane, heptane, cyclohexane, methylcyclohexane, or a mixture of two or more thereof. The polymerization can also be effected in the monomer or one of the monomers, assuming that this can be kept in the liquid state, or further in the gaseous phase.

The polymerization temperature can be between $20°$ and $200°$ C., and is preferably when operating in suspension between $50°$ and $80°$ C. The pressure can be between atmospheric pressure and 50 atmospheres, and it is preferably between 10 and 25 atmospheres, although the pressure is naturally dependent on the temperature applied.

The polymerization can be effected continuously or batchwise.

The preparation of block copolymers can also be effected by any applicable process. It is preferred to employ a two-stage process consisting in first polymerizing an olefin, e.g., propylene, as described previously for homopolymerization, and then polymerizing another mono-olefin and/or a diolefin, e.g., ethylene, in the presence of the still active homopolymer chain. This second polymerization can be effected after the monomer which has not reacted in the first stage has been completely or partially removed.

The organometallic compound and the catalytic complex can be added to the polymerization medium separately. It is also possible to bring them into contact, suitably at a temperature between $-40°$ and $80°$ C., for a certain period (e.g., up to 2 hours) before they are introduced into the polymerization reactor.

The total amount of organometallic compound used is not critical; it can be greater than 0.1 millimole per liter of diluent, of liquid monomer, or of reactor volume, and preferably it is greater than 1 millimole per liter.

The amount of catalytic complex used can suitably be determined in accordance with its content of $TiCl_3$. It is preferably selected so that the concentration of the complex in the polymerization medium is higher than 0.01 millimole of $TiCl_3$ per liter of diluent, of liquid monomer, or of reactor volume, and most preferably greater than 0.2 millimole per liter.

The ratio of the organometallic compound (the activator) to the catalytic complex is also not critical. This ratio is preferably selected so that the molar ratio of organometallic compound to $TiCl_3$ present in the complex will be between 0.5 and 10, and most preferably between 1 and 8. Particularly good results are obtained when the molar ratio is between 2 and 5.

The following examples illustrate the invention and are not intended to limit the invention, but rather, are presented for purposes of illustration. Example I illustrates a procedure for obtaining the novel catalyst complex of this invention; and Example II illustrates the use of this catalyst in polymerizing propylene.

EXAMPLE I

To a solution of 15 milliliters of $TiCl_4$ in 60 milliliters of n-heptane, which had been cooled to 0° C., there was added 88 milliliters of a 25 weight percent solution of diethylaluminum chloride in heptane dropwise over a period of 4 hours with stirring. The mixture was warmed to 65° C. over 1 hour and held at that temperature for 1 hour. The resultant reduced solid was washed with n-heptane, filtered and dried. To 5.5 grams of this solid there was added 60 milliliters of n-heptane and the mixture was heated to 35° C. To the resulting mixture there was added nine milliliters of diisoamyl ether complexing agent, followed by stirring for 1 hour. The resultant treated solid was washed with n-heptane, filtered and dried.

Twenty grams of silica, having a surface area of about 600 square meters per gram and an average mesh size of 200, was heat treated in air at a temperature of 500° C. for 3.5 hours. Twenty grams of the silica so treated were placed in a vessel with 60 milliliters of n-heptane and 10 milliliters of a 25 weight percent solution of diethylaluminum chloride in heptane and the contents were heated at reflux (104° C.) for two hours. The resultant treated silica was washed with n-heptane, filtered and dried in vacuum.

To a mixture containing 60 milliliters of heptane and 5.5 grams of the treated solid obtained above there was added 5.2 grams of the treated silica and this was heated to 65° C. There was then added thereto a solution of 12 milliliters of $TiCl_4$ in 18 milliliters of n-heptane. The resulting material was heated at 65° C. for 2 hours, filtered and dried under vacuum to obtain a novel catalyst complex. This complex was ground in a jar mill to obtain particles having a mean particle size in the range of about 1 to about 25 microns.

EXAMPLE II

To an autoclave containing 470 milliliters of n-heptane there was added 0.8 gram of the catalyst complex prepared in Example I, transfer being accomplished by syringe with 30 milliliters of n-heptane. To the autoclave there was also added 7.2 milliliters of a 25 weight percent solution of diethylaluminum chloride in heptane by syringe. The autoclave was heated to 55° C. and the contents stirred at 700 RPM. Propylene was introduced into the autoclave at 30 pounds per square inch gauge (210 kPa) and maintained at this pressure for the reaction period of 3.5 hours. The reactor contents were cooled and depressurized to atmospheric pressure and the catalyst was deactivated with 100 milliliters of isopropyl alcohol. The resulting polymer was stirred overnight in isopropyl alcohol, filtered and dried overnight in a vacuum oven. The tacticity of the polymer was determined by extraction in boiling n-heptane, using a Jacketed Soxlet Extractor, followed by overnight drying in a vacuum oven. The weight percent of polymer insoluble in n-heptane is the isotactic index of the polymer.

An additional series of runs were made as in Example II but wherein the silica treated with diethylaluminum chloride in the catalyst was replaced with (1) untreated silica, (2) silica treated with triethylaluminum or (3) silica treated with $CCl_4$. Still another run was carried out wherein a catalyst was prepared and was used to polymerize propylene using the identical procedures described in Example 1 of British Pat. No. 1,391,067 starting at line 51 on page 7.

In the case wherein untreated silica was used, it was heated in air at 500° C. for 3 hours. When the silica was treated with triethylaluminum or carbon tetrachloride the following procedures were used. Before treating with triethylaluminum, the silica was also heated in air at 500° C. for 3.5 hours. Then 20 grams of the silica so heated was refluxed in 60 milliliters of n-heptane and nine milliliters of a 25 weight percent solution of triethylaluminum in heptane. For treatment with carbon tetrachloride, the silica was treated with hydrogen at 500° C. for 3.5 hours. The temperature was then reduced to 300° C. and 15 milliliters of carbon tetrachloride was passed over the silica by bubbling nitrogen through the carbon tetrachloride. The results obtained are set forth in Table I.

TABLE I

| Run No. | Catalyst Used | Grams Polypropylene Produced Per Total Grams of Titanium In Catalyst | Weight Percent Polypropylene Insoluble In Hot n-Heptane |
|---|---|---|---|
| I | British Pat. No. 1,391,067 | 1557 | 97 |
| II | Containing Silica Treated with Diethylaluminum Chloride (Example I) | 963 | 97 |
| III | Containing Silica Treated with Triethylaluminum | 1755 | 69 |
| IV | Containing Silica treated with $CCl_4$ | 941 | 64 |
| V | Containing Untreated Silica | 616 | 95 |

The above data show that when the novel catalyst of this invention was used in polymerizing propylene, the activity of the catalyst was reduced, as desired, over the catalyst of British Pat. No. 1,391,067, but the isotacticity of the propylene polymer was unchanged. Run No. V shows that when untreated silica was present in the catalyst system productivity was severely reduced. It should be noted that even though the activity of catalyst II is reduced compared to that obtained from catalyst I, it is not reduced to the level expected from a simple physical mixture, i.e., about 780. This value was expected because half the amount of titanium complex was used in II compared to I. Thus, the use of diethylaluminum chloride treated silica with the titanium complex results in a more effective use of titanium. This is especially evident when comparing the results from catalysts II and V. That the choice of material used to treat the silica is critical is also apparent from Runs. Nos. III and IV wherein the isotacticity of the polymer was extremely poor.

Although the invention has been described in considerable detail with particular reference to certain preferred embodiments thereof, variations and modifications can be effected within the spirit and scope of the invention as described hereinbefore, and as defined in the appended claims.

We claim:

1. A process for the polymerization of an olefin which comprises contacting said olefin at elevated temperatures and elevated pressures with an activator and a solid, particulate, catalyst complex prepared by a process comprising reducing TiCl$_4$, contacting the resultant reduced solid with a complexing agent to obtain a treated solid and contacting the treated solid with TiCl$_4$ in the presence of silica which has been treated with an alkylaluminum halide.

2. A process as defined in claim 1 wherein said alkylaluminum halide is defined by the following formula:

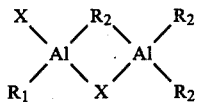

wherein R$_1$ is an alkyl radical having from about one to about six carbon atoms, each R$_2$ is a member selected from the group consisting of alkyl radicals having from about one to about six carbon atoms and halogen radicals, and each X is a halogen radical.

3. A process as defined in claim 1 wherein said alkylaluminum halide is diethylaluminum chloride.

4. A process as defined in claim 1 wherein said silica has a mean particle size in the range of about 1 to about 100 microns.

5. A process as defined in claim 1 wherein said silica has a mean particle size in the range of about 1 to about 25 microns.

6. A process as defined in claim 2 wherein said silica has a mean particle size in the range of about 1 to about 100 microns.

7. A process as defined in claim 2 wherein said silica has a mean particle size in the range of about 1 to about 25 microns.

8. A process as defined in claim 3 wherein said silica has a mean particle size in the range of about 1 to about 100 microns.

9. A process as defined in claim 3 wherein said silica has a mean particle size in the range of about 1 to about 25 microns.

10. A process as defined in claim 1 wherein said silica is calcined at a temperature in the range of about 350° to about 700° C. for about one to about five hours prior to being treated with said alkylaluminum halide.

11. A process as defined in claim 1 wherein said silica is calcined at a temperature in the range of about 400° to about 500° C. for about two to about three hours prior to being treated with said alkylaluminum halide.

12. A process as defined in claim 2 wherein said silica is calcined at a temperature in the range of about 350° to about 700° C. for about one to about five hours prior to being treated with said alkylaluminum halide.

13. A process as defined in claim 2 wherein said silica is calcined at a temperature in the range of about 400° to about 500° C. for about two to about three hours prior to being treated with said alkylaluminum halide.

14. A process as defined in claim 3 wherein said silica is calcined at a temperature in the range of about 350° to about 700° C. for about one to about five hours prior to being treated with said alkylaluminum halide.

15. A process as defined in claim 3 wherein said silica is calcined at a temperature in the range of about 400° to about 500° C. for about two to about three hours prior to being treated with said alkylaluminum halide.

16. A process as defined in claim 1 wherein said silica is treated with said alkylaluminum halide by introducing them into a hydrocarbon solvent, the molar ratio of alkylaluminum halide to silica being in the range of about 1:40 to about 1:1, and heating the resultant slurry to a temperature in the range of about 70° to about 300° C. for about one to about ten hours.

17. A process as defined in claim 1 wherein said silica is treated with said alkylaluminum halide by introducing them into a hydrocarbon solvent, the molar ratio of alkylaluminum halide to silica being in the range of about 1:20 to about 1:2, and heating the resultant slurry to a temperature in the range of about 100° to about 200° C. for about two to about five hours.

18. A process as defined in claim 2 wherein said silica is treated with said alkylaluminum halide by introducing them into a hydrocarbon solvent, the molar ratio of alkylaluminum halide to silica being in the range of about 1:40 to about 1:1, and heating the resultant slurry to a temperature in the range of about 70° to about 300° C. for about one to about ten hours.

19. A process as defined in claim 2 wherein said silica is treated with said alkylaluminum halide by introducing them into a hydrocarbon solvent, the molar ratio of alkylaluminum halide to silica being in the range of about 1:20 to about 1:2, and heating the resultant slurry to a temperature in the range of about 100° to about 200° C. for about two to about five hours.

20. A process as defined in claim 3 wherein said silica is treated with said alkylaluminum halide by introducing them into a hydrocarbon solvent, the molar ratio of alkylaluminum halide to silica being in the range of about 1:40 to about 1:1, and heating the resultant slurry to a temperature in the range of about 70° to about 300° C. for about one to about ten hours.

21. A process as defined in claim 3 wherein said silica is treated with said alkylaluminum halide by introducing them into a hydrocarbon solvent, the molar ratio of alkylaluminum halide to silica being in the range of about 1:20 to about 1:2, and heating the resultant slurry to a temperature in the range of about 100° to about 200° C. for about two to about five hours.

22. A process as defined in claim 1 wherein said TiCl$_4$ is reduced to a solid product based on TiCl$_3$ by means of treatment with a reducing agent of the formula AlR$_n$X$_{3-n}$, wherein R is a hydrocarbon radical containing from about 1 to about 18 carbon atoms, X is halogen and n is an integer greater than 0 but no greater than 3, said treatment being conducted in an inert medium.

23. A process as defined in claim 2 wherein said TiCl$_4$ is reduced to a solid product based on TiCl$_3$ by means of treatment with a reducing agent of the formula AlR$_n$X$_{3-n}$, wherein R is a hydrocarbon radical containing from about 1 to about 18 carbon atoms, X is halogen and n is an integer greater than 0 but no greater than 3, said treatment being conducted in an inert medium.

24. A process as defined in claim 3 wherein said TiCl$_4$ is reduced to a solid product based on TiCl$_3$ by means of treatment with a reducing agent of the formula AlR$_n$X$_{3-n}$, wherein R is a hydrocarbon radical containing from about 1 to about 18 carbon atoms, X is halogen and n is an integer greater than 0 but no greater than 3, said treatment being conducted in an inert medium.

25. A process as defined in claim 1 wherein said complexing agent is an organic compound containing groups capable of donating one or more pairs of electrons selected from the group consisting of ethers, thioethers, thiols, phosphines, stibines, arsines, amines, amides, ketones and esters, said treatment being conducted in an inert diluent.

26. A process as defined in claim 2 wherein said complexing agent is an organic compound containing groups capable of donating one or more pairs of electrons selected from the group consisting of ethers, thioethers, thiols, phosphines, stibines, arsines, amines, amides, ketones and esters, said treatment being conducted in an inert diluent.

27. A process as defined in claim 3 wherein said complexing agent is an organic compound containing groups capable of donating one or more pairs of electrons selected from the group consisting of ethers, thioethers, thiols, phosphines, stibines, arsines, amines, amides, ketones and esters, said treatment being conducted in an inert diluent.

28. A process as defined in claim 1 wherein said complexing agent is selected from the group consisting of those having the formulas $R'-O-R''$, $R'-S-R''$, $R'-N-R''$ and $R'-S-H$, wherein $R'$ and $R''$ are each a hydrocarbon radical containing from 1 to 15 carbon atoms.

29. A process as defined in claim 2 wherein said complexing agent is selected from the group consisting of those having the formulas $R'-O-R''$, $R'-S-R''$, $R'-N-R''$ and $R'-S-H$, wherein $R'$ and $R''$ are each a hydrocarbon radical containing from 1 to 15 carbon atoms.

30. A process as defined in claim 3 wherein said complexing agent is selected from the group consisting of those having the formulas $R'-O-R''$, $R'-S-R''$, $R'-N-R''$ and $R'-S-H$, wherein $R'$ and $R''$ are each a hydrocarbon radical containing from 1 to 15 carbon atoms.

31. A process as defined in claim 1 wherein the weight percent of the treated silica in the catalytic complex is in the range of about 90 to about 10.

32. A process as defined in claim 1 wherein the weight percent of the treated silica in the catalytic complex is in the range of about 60 to about 40.

33. A process as defined in claim 2 wherein the weight percent of the treated silica in the catalytic complex is in the range of about 90 to about 10.

34. A process as defined in claim 2 wherein the weight percent of the treated silica in the catalytic complex is in the range of about 60 to about 40.

35. A process as defined in claim 3 wherein the weight percent of the treated silica in the catalytic complex is in the range of about 90 to about 10.

36. A process as defined in claim 3 wherein the weight percent of the treated silica in the catalytic complex is in the range of about 60 to about 40.

37. A process as defined in claim 1 wherein said activator has the formula $AlR'''_m X'_{3-m}$ wherein $R'''$ is a hydrocarbon radical containing from 1 to 18 carbon atoms, $X'$ is halogen and m is a number greater than 0 but no greater than 3.

38. A process as defined in claim 2 wherein said activator has the formula $AlR'''_m X'_{3-m}$ wherein $R'''$ is a hydrocarbon radical containing from 1 to 18 carbon atoms, $X'$ is halogen and m is a number greater than 0 but no greater than 3.

39. A process as defined in claim 3 wherein said activator has the formula $AlR'''_m X'_{3-m}$ wherein $R'''$ is a hydrocarbon radical containing from 1 to 18 carbon atoms, $X'$ is halogen and m is a number greater than 0 but no greater than 3.

* * * * *

UNITED STATES PATENT OFFICE
CERTIFICATE OF CORRECTION

Patent No. 4,434,281          Dated February 28, 1984

Inventor(s) Harold E. Swift and Richard W. Lundun

It is certified that error appears in the above-identified patent and that said Letters Patent are hereby corrected as shown below:

Col. 5, line 49, " $AlR'''_m X'_{3-m}$ " should read -- $AlR''_m X'_{3-m}$ --

Signed and Sealed this

Nineteenth Day of March 1985

[SEAL]

Attest:

DONALD J. QUIGG

Attesting Officer      Acting Commissioner of Patents and Trademarks